Feb. 24, 1959
W. S. BRINK
2,874,997
WHEEL CONSTRUCTION
Filed Sept. 12, 1955
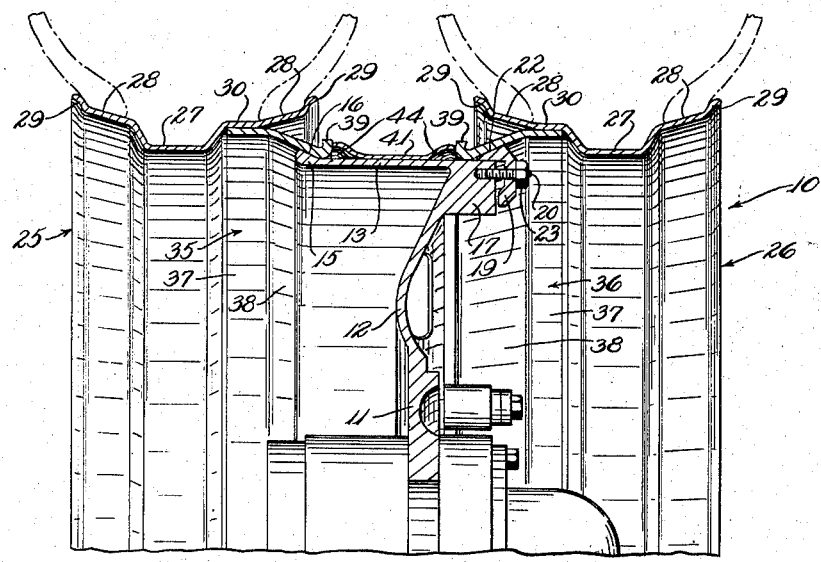
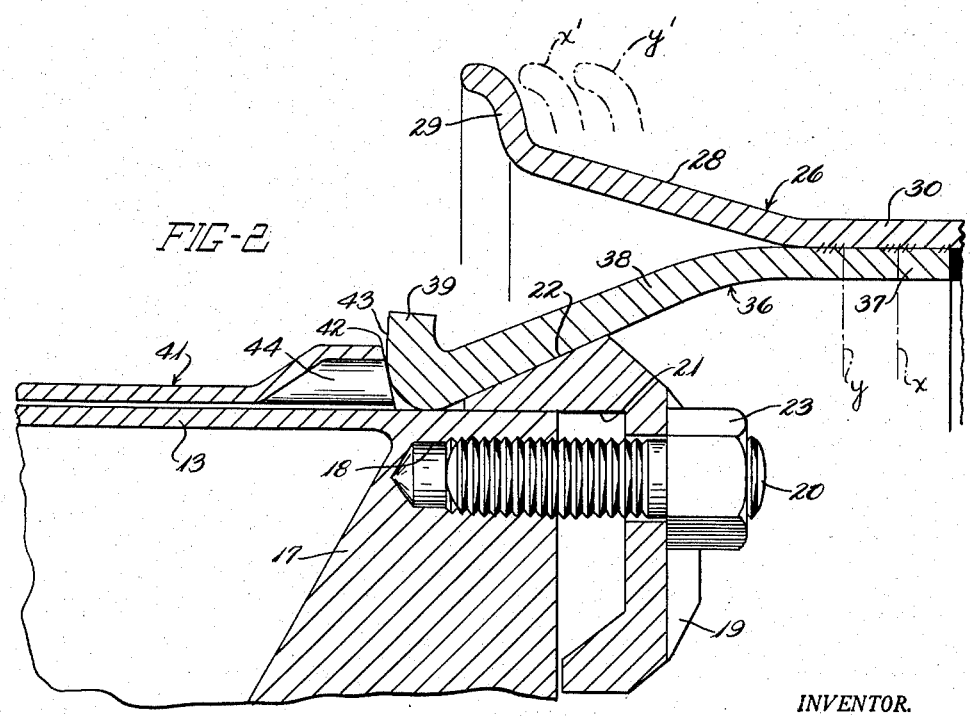
INVENTOR.
WINFIELD S. BRINK
BY
W. A. Fraser
ATTY.

United States Patent Office 2,874,997
Patented Feb. 24, 1959

2,874,997

WHEEL CONSTRUCTION

Winfield S. Brink, Akron, Ohio, assignor to The Firestone Tire & Rubber Company, Akron, Ohio, a corporation of Ohio Application September 12, 1955, Serial No. 533,661

1 Claim. (Cl. 301—13)

This invention relates to a dual truck wheel construction and more particularly to a method of assembling a pair of drop-center rims on a type of wheel disclosed hereinafter.

The present invention is especially adapted for use with a novel, drop-center rim for truck tires. Such a rim has bead seats inclined at an angle of about 15° and one of the seats adjoins a flat ledge portion, the presence of which restricts the drop-center well to a size which allows only one bead at a time to enter the well, thus providing a safe rim construction in respect to a deflated tire being prevented from being thrown from the wheel in the event of a blowout in service. In the preferred form of the invention, this flat ledge portion is utilized in assembling such rims on a Dayton-type or similar wheel, the rims being provided with mounting rings which extend inwardly from the flat ledges of the rim to the wheel flange where the mounting rings are clamped in place against the lateral edges of a spacer ring. The mounting rings are welded to the rim ledges and since the ledges have substantial length, the rings can be welded in various positions to provide a relatively wide choice of wheel spacings. With such a construction, the rims may be readily removed from and replaced on the wheel and no particular skill on the part of the user is required.

It is accordingly an object of the invention to provide an improved dual wheel construction particularly adapted for use with drop-center rims.

Another object is to provide a wheel construction which may be readily assembly and disassembled providing convenient and easy replacement of the individual rims.

Yet another object is to provide a wheel construction adapted to provide a wide range of wheel spacing.

Other objects and advantages will be more fully apparent from the following description of a preferred form of the invention, reference being had to the accompanying drawings in which:

Figure 1 is a fragmentary, transverse sectional view of a pair of rims assembled with a wheel in accordance with the present invention; and Figure 2 is a fragmentary view, on an enlarged scale, of a portion of Figure 1 showing the mounting ring which embodies the invention assembled with the other parts of the wheel just as the clamping members are tightened and showing diagrammatically how the spacing of the rims may be altered without changing the spacing of the mounting rings.

The invention is described in connection with a wheel often referred to, in the wheel industry as a Dayton-type wheel, indicated generally at 10, and comprising a hub 11 from which a disc portion 12 extends outwardly to terminate in a peripheral flange 13. The flange 13 is substantially cylindrical in form but it terminates in a thickened edge 15 having an outwardly flaring conical surface 16. The wheel is also provided with a plurality of bosses 17 adjacent the flange 13 and having threaded holes 18 which enable a plurality of clamp members 19 to be secured to the wheel by the stud bolts 20 and nuts 23. Each of the members 19 has a cylindrical surface 21 adapted to have sliding engagement with the flange 13 and has an outward conical surface 22 having a function to be described later. The wheel 10, as it has been so far described, is conventional.

The wheel is completed by two identical rims indicated at 25 and 26. It is sufficient to note in describing the present invention that the rims 25 and 26 are drop-center rims, each having a drop-center well 27, bead seats 28 which extend at an angle of about 15° to the axis of the rim and which terminate in relatively small side flanges 29. One of the bead seats is connected to the drop-center well by a cylindrical ledge 30 which has a substantial axial length. The ledge has several functions. It aids inflation of the tire. It limits the drop-center well to a size which permits only one bead of the tire to enter the drop-center well in the event of a blowout thus retaining the tire on the rim. And it provides means to mount the rims 25 and 26 on the wheel.

The rims 25 and 26 are connected to the wheel 10 by means of the connecting or mounting rings indicated generally at 35 and 36. Like the rims, the connecting rings 35 and 36 are identical. It will be noted that the rings have outer cylindrical flanges 37 and inwardly angled portions 38 terminating in short, radial flanges 39. The flanges 37 are spot welded at a suitable number of points to their respective ledges 30 in any relative axial relation therewith within limits permitted by the axial extent of flanges 37 and ledges 30, as will be understood by reference to Figure 2 and the explanation thereof given hereinafter.

To assemble the parts, the rim 25 is telescoped over the wheel flange 13 until the angled portion 38 of ring 35 comes into contact with the inclined surface 16 of the flange 13. A spacer band 41 is then placed over flange 13 with its end 42 abutting the end 43 of ring 35. The spacer 41 is conventional in construction, comprising a generally cylindrical surface whose circumferential edges are scalloped as at 44 to provide effective abutting surfaces for the ends 43 of the two connecting rings. The rim 26 is then placed upon the wheel with its ring 35 partially telescoped onto the flange 13 and the clamps 19 are bolted onto the bosses 17. The nuts 23 are tightened to draw the clamps inwardly upon the wheel and as this is done, the conical surfaces 22 of the clamps will engage the inside surface of angled portion 38 of ring 36 and force the parts leftwardly, as viewed in Figure 1, taking up the slack which exists in the fit of the parts. Finally the nuts 23 are tightened with sufficient force to wedge the parts firmly together.

The arrangement is particularly advantageous in providing a variable wheel spacing, enabling the tires of various sizes to be used. The ledges 30 are of sufficient extent to enable this to be done while still providing a strong and adequate bearing surface between the rim and the mounting ring. For example, as indicated diagrammatically in Figure 2, the mounting ring 36 may be welded to the rim so that the flange 37 of the ring terminates at the dotted line indicated at $x$. In such a case the rim will take the dotted line position indicated at $x'$ and the spacing of the tires on the wheel will be accordingly increased. If a yet greater tire spacing is desired, the ring may be welded to the ledge 30 so that it takes the dotted line position indicated at $y$ and in such a case the rim will take the dotted line position indicated at $y'$. Such a feature is of great commercial advantage in enabling the assembly to be used effectively on trucks of various manufacture and with tires of different size.

The invention thus provides a simple and effective means of assembling drop-center rims to a dual wheel.

However, various modifications will no doubt, occur to those skilled in the art without departing from the spirit and scope of the invention, the essential features of which are summarized in the claim below.

I claim:

A wheel structure comprising in combination, a wheel having an outer cylindrical portion terminating at one edge in an outwardly flared surface and having at the other edge a plurality of bosses and a corresponding number of clamps supported by said bosses, said clamps being secured to said bosses by bolts extending into said bosses, whereby the said clamps are drawn axially toward said wheel when said bolts are tightened, said clamps having outwardly flaring wedge surfaces, a pair of one-piece drop center rims of substantially uniform wall thickness, each said rim having bead seat portions having radially inner surfaces extending axially outwardly at an angle to the axis of said rim, and having a flat, cylindrical surface immediately adjoining one of said bead seat portions, a pair of connecting rings each having an outward flange portion secured to said cylindrical surface axially inwardly of said bead seat portion and radially outwardly of said drop center, said cylindrical surfaces being of substantial axial extent relative to the width of said rims, said rings each having an inwardly directed angular portion terminating in a radially extending flange and adapted to contact said flared wheel surface and said clamp wedge surfaces respectively, and a spacer band positioned on said wheel and adapted to maintain said rings in spaced relation and adapted to transmit the axial thrust exerted by said clamps on one said ring to the other said ring.

References Cited in the file of this patent

UNITED STATES PATENTS

| | | |
|---|---|---|
| 2,100,626 | Brink | Nov. 30, 1937 |
| 2,316,642 | Woodward | Apr. 13, 1943 |
| 2,631,894 | Horn | Mar. 17, 1953 |
| 2,779,631 | Powers | Jan. 29, 1957 |